(12) United States Patent
Caldarise et al.

(10) Patent No.: US 9,823,493 B2
(45) Date of Patent: Nov. 21, 2017

(54) COMPLIANT DYNAMIC TRANSLATION ZONES FOR CONTACT LENSES

(75) Inventors: Salvatore G. Caldarise, St. Johns, FL (US); Ryan Hawke, Jacksonville, FL (US); Daniel B. Otts, Fruit Cove, FL (US); Jeffrey H. Roffman, Saint Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 177 days.

(21) Appl. No.: 13/598,722

(22) Filed: Aug. 30, 2012

(65) Prior Publication Data

US 2014/0063445 A1 Mar. 6, 2014

(51) Int. Cl.
*G02C 7/00* (2006.01)
*G02C 7/02* (2006.01)
*G02C 7/04* (2006.01)
*G02C 3/00* (2006.01)

(52) U.S. Cl.
CPC ............ *G02C 7/043* (2013.01); *G02C 7/048* (2013.01); *G02C 7/049* (2013.01)

(58) Field of Classification Search
CPC ........ G02C 7/043; G02C 7/048; G02C 7/049; G02C 7/044; G02C 7/042; G02C 7/04; G02C 2202/20; G02C 7/06; G02C 7/021; G02C 2202/04; G02C 7/047; G02C 7/041; G02C 7/045; G02C 7/028; G02C 2202/22; G02C 7/046; G02C 2202/16; A61F 2/1616; A61F 2/1618; A61F 2/1654; A61F 2/1613; A61F 9/0017; A61F 2002/164

USPC .............. 351/159.2, 159.08, 159.21, 351/159.01–159.09, 159.1–159.19, 351/159.23, 159.33, 159.34, 159.41, 351/159.42, 159.73, 219
See application file for complete search history.

(56) References Cited

U.S. PATENT DOCUMENTS

| 4,477,158 | A | 10/1984 | Pollock et al. |
| 4,549,794 | A | 10/1985 | Loshaek et al. |
| 4,702,573 | A | 10/1987 | Morstad |
| 6,942,341 | B2 * | 9/2005 | Ye .................. G02C 7/043 264/2.5 |
| 7,052,132 | B2 | 5/2006 | Ezekiel |
| 7,080,906 | B2 * | 7/2006 | Lindacher ........... C07K 1/22 351/159.09 |
| 7,216,978 | B2 | 5/2007 | Perez et al. |
| 7,430,930 | B2 | 10/2008 | Zeller et al. |

(Continued)

FOREIGN PATENT DOCUMENTS

WO WO2008/007955 A1 1/2008
WO WO 08/115251 A1 9/2008

OTHER PUBLICATIONS

European Search Report for Application No. EP13182509 dated Nov. 25, 2013.

(Continued)

*Primary Examiner* — Mustak Choudhury
(74) *Attorney, Agent, or Firm* — Carl J. Evens

(57) ABSTRACT

A contact lens incorporating one or more compliant dynamic translation zones fabricated from a material that is readily deformable under eyelid pressure during blinking and which allows for the control over translation of the contact lens on the eye. The one or more compliant dynamic translation zones provide for the comfortable relative movement of the contact lens over the eye.

13 Claims, 6 Drawing Sheets

(56) References Cited

U.S. PATENT DOCUMENTS

| | | | |
|---|---|---|---|
| 7,434,930 B2 | 10/2008 | Lindacher et al. | |
| 7,452,075 B2* | 11/2008 | Iuliano | G02C 7/041 |
| | | | 351/159.18 |
| 7,543,935 B2 | 6/2009 | Ezekiel | |
| 7,559,650 B2 | 7/2009 | Iuliano | |
| 7,699,464 B2* | 4/2010 | Iuliano | G02C 7/041 |
| | | | 351/159.34 |
| 2002/0021410 A1 | 2/2002 | Ye et al. | |
| 2003/0095231 A1 | 5/2003 | Ezekiel | |
| 2004/0017542 A1* | 1/2004 | Lindacher et al. | 351/160 R |
| 2005/0099595 A1 | 5/2005 | Lindacher | |
| 2007/0132949 A1* | 6/2007 | Phelan | C08F 283/12 |
| | | | 351/159.33 |
| 2008/0013044 A1 | 1/2008 | Wanders | |
| 2008/0143957 A1* | 6/2008 | Linhardt et al. | 351/160 H |
| 2008/0231799 A1* | 9/2008 | Iuliano | 351/161 |
| 2012/0075580 A1 | 3/2012 | Roffman et al. | |
| 2012/0206692 A1 | 8/2012 | Yamaguchi et al. | |

OTHER PUBLICATIONS

Report issued by the Intellectual Property Office of Singapore dated Sep. 15, 2014 for Application No. 2013061973.

\* cited by examiner

COMPLIANT DYNAMIC TRANSLATION ZONES FOR CONTACT LENSES

BACKGROUND OF THE INVENTION

1. Field of the Invention

The present invention relates to stabilization and/or translation zones for contact lenses requiring rotational stability and linear movement on the eye, such as toric contact lenses, and more particularly to contact lenses requiring rotational stability and linear translation and incorporating one or more dynamic stabilization and/or translation zones that have varying physical properties.

2. Discussion of the Related Art

Myopia or nearsightedness is an optical or refractive defect of the eye wherein rays of light from an image focus to a point before they reach the retina. Myopia generally occurs because the eyeball or globe is too long or the dome of the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the dome of the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism has nothing do to with globe size or cornea steepness, but rather it is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures at different angles which are preferably maintained relative to the eye. Toric lenses may be utilized in eyeglasses, intraocular lenses and contact lenses. The toric lenses used in eyeglasses and intraocular lenses are held fixed relative to the eye thereby always providing optimal vision correction. However, toric contact lenses may tend to rotate on the eye thereby temporarily providing sub-optimal vision correction. Accordingly, toric contact lenses also include a mechanism to keep the contact lens relatively stable on the eye when the wearer blinks or looks around.

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. The use of contact lenses is problematic in that each contact lens of the pair must be maintained at a specific orientation while on the eye to be effective. When the contact lens is first placed on-eye, it must automatically position, or auto-position, itself and then maintain that position over time. However, once the contact lens is positioned, it tends to rotate on the eye due to the force exerted on the contact lens by the eyelids during blinking as well as eyelid and tear film movement.

Maintenance of the on-eye orientation of a contact lens typically is accomplished by altering the mechanical characteristics of the contact lens. For example, prism stabilization, including decentering of the contact lens' front surface relative to the back surface, thickening of the inferior contact lens periphery, forming depressions or elevations on the contact lens' surface, and truncating the contact lens edge, are all methods that have been utilized.

Additionally, static stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed.

The challenge with static stabilization zones is a tradeoff between contact lens stability and comfort, plus the physical limitations associated with increased thickness. With a static stabilization zone, the slope of the stabilization zone is fixed in the contact lens. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. A static design requires tradeoffs in performance between these two modes.

Contact lenses may also be worn to address presbyopia. In one type of such lenses, distance and near vision regions are concentrically arranged around the geometric center of the lens. Light passing though the optical zone of the lens is concentrated and focused at more than one point in the eye. These lenses are generally used in simultaneous vision mode. In simultaneous vision, portions of the lens optical zone focused for distance and near are available at the same time, focusing light from both object distances simultaneously. This is disadvantageous as image quality and image contrast may be degraded.

In another type of contact lens meant to address presbyopia, the lens alternates power between distance and near, or distance, near and intermediate. One type of alternating vision lens comprises an optic portion which changes power due to an external stimulus.

In another type of alternating power contact lens; namely, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. This translating lens moves vertically when the person wearing the lens shifts their gaze downwardly, for example, to read. This upwardly positions the near vision portion in the center of the wearer's gaze. Substantially all of the light passing though the optical zone may be focused at a single point in the eye based on gaze.

One type of translating lens has a truncated shape. That is, unlike most lenses that are substantially continuously circular or oval, the lower portion of the truncated contact lens if flattened by cutting off or shortening that part of the lens. This results in a substantially flat and thicker edge at the bottom of the lens. It is this thicker edge that interacts with the lower eyelid to achieve the required translation. Exemplary descriptions of such lenses are set forth in a number of patents, including U.S. Pat. No. 7,543,935, U.S. Pat. No. 7,434,930, U.S. Pat. No. 7,052,132, and U.S. Pat. No. 4,549,794. However, a relatively flat and thicker edge on contact lenses such as these may tend to reduce comfort.

Accordingly, it would be advantageous to design a contact lens with dynamic stabilization zones that auto-position the contact lens quickly and hold and/or maintain the desired position for optimal visual acuity regardless of eye movement, blinking and tears. In addition, it would also be advantageous to design a contact lens with a compliant dynamic translation zone for ensuring proper linear movement. It would also be advantageous to design the both dynamic stabilization and translation zones for comfortable interaction with the eyelids.

SUMMARY OF THE INVENTION

The dynamic stabilization and compliant dynamic translation zone contact lens of the present invention overcomes a number of disadvantages associated with orientating and maintaining the orientation of contact lenses on a wearer's eye and ensuring smooth and accurate linear translation of the lens on the eye while also providing a high degree of comfort. Translation as used herein shall mean the relative motion of the contact lens, and in particular the optic zone of the contact lens against the and with respect to the natural pupil of the eye.

In accordance with one aspect, the present invention is directed to an ophthalmic device shaped and dimensioned to a user's eye. The ophthalmic device comprises a corrective lens having an optic zone with a superior region including far distance correction optics, an inferior region including near correction optics, a peripheral zone surrounding the optic zone, a front surface and a back surface, and at least one compliant dynamic translation zone incorporated into the contact lens between the front and back surface in the peripheral zone, the at least one compliant translation zone being formed from a deformable material and configured and positioned to interact with the eyelids of a user such that when the user's eye gazes in an inferior direction, the at least one compliant translation zone interacts with the eyelids to ensure that the near correction optics align with the pupil of the eye and when the user's eye gazes in at least one of a straight or superior direction, the far distance correction optics align with the pupil of the eye.

In accordance with another aspect, the present invention is directed to a method for making an ophthalmic device. The method comprising: the step of forming a contact lens for treating presbyopia, the contact lens including an optical zone having distance correction optics and near correction optics, and incorporating at least one compliant dynamic translation zone into the contact lens, the at least one compliant dynamic translation zone facilitating motion of the optic zone of the contact lens relative to the pupil of an eye for optimal visual acuity, and wherein the at least one compliant dynamic translation zone being configured and positioned to interact with the eyelids of a user such that when the user's eye gazes in an inferior direction, the at least one compliant dynamic translation zone interacts with the eyelids to ensure that the near correction optics align with the pupil of the eye and when the user's eye gazes in at least one of a straight or superior direction, the far distance correction optics align with the pupil of the eye.

Contact lenses requiring rotational stabilization in order to maintain optimal visual acuity, for example, toric contact lenses currently rely on weight and/or eyelid pressure to maintain the contact lens in the correct position on the eye. In addition, certain types of lenses, for example, segmented lenses for presbyopia require linear translation on the eye which may be accomplished with a truncated shape. The present invention is directed to a contact lens comprising one or more dynamic stabilization zones and one or more compliant dynamic stabilization zones rather than one or more static stabilization zones and/or truncated shapes. The one or more dynamic stabilization zones and/or the one or more compliant dynamic translation zones may be filled with or fabricated from a material that has varying physical properties. More specifically, the one or more dynamic stabilization zones and/or the one or more compliant dynamic translation zones may be fabricated from a material that is readily deformable under the pressure of eyelid movement. With one or more stabilization zones in accordance with the present invention, as the eyelids move, the slope of the contact area between the eyelids and the stabilization zone changes, thereby providing for more rapid rotational adjustment of the contact lens on the eye. In addition, as the eyelids converge into full blink position, the material forming the one or more dynamic stabilization zones redistributes and the entire dynamic stabilization zone flattens out thereby providing additional comfort. With one or more compliant dynamic translation zones, a translation effect equivalent to the effect caused by truncation may be achieved but with increased comfort as the zone material deforms and more closely conforms under eyeball and eyelid pressure.

Contact lenses in accordance with the present invention may comprise one or more compliant dynamic translation zones. These one or more dynamic stabilization and/or translation zones may comprise any suitable configuration and may be positioned at any suitable location on the contact lens to meet any number of design requirements. The contact lenses incorporating the one or more dynamic stabilization and/or compliant dynamic translation zones utilize the applied force from eyelid movement to change the shape of the one or more dynamic stabilization and/or compliant dynamic translation zones, which in turn provides another design parameter to improve rotational speed and contact lens rotational stability as well as required linear movement.

The contact lens incorporating one or more compliant dynamic stabilization and/or translation zones in accordance with the present invention provides for improved auto-positioning, improved rotational speed, improved contact lens rotational stability, improved linear translation and improved comfort. The contact lens incorporating one or more dynamic stabilization and/or translation zones is relatively simple to design and manufacture. The contact lens incorporating one or more compliant dynamic stabilization and/or translation zones is also relatively inexpensive to manufacture as compared to currently manufactured contact lenses. In other words, the incorporation of dynamic stabilization and/or translation zones does not require a significant increase in manufacturing cost.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
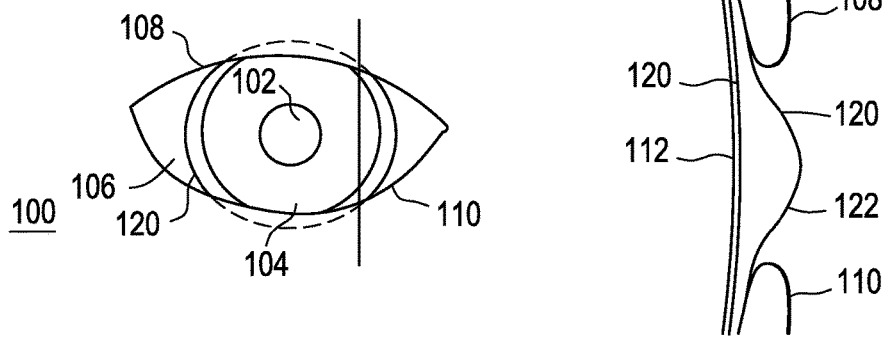
FIG. 1 is a diagrammatic representation of a prior art contact lens having an eyelid stabilized design feature in planar and cross sectional views.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. The design of the contact lenses and the material choice of silicone hydrogel result in a very comfortable interaction of the lenses to that of the wearer's eyelids.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Currently, contact lenses requiring rotational stabilization in order to maintain optimal visual acuity, for example, toric contact lenses, rely on either weight or eyelid pressure to maintain the contact lens oriented on the eye. Referring to FIG. 1, there is illustrated in both plan and cross-sectional view an eyelid pressure stabilized design wherein the contact lens 120 is thicker in a stabilization zone or region 122. The contact lens 120 is positioned on the eye 100 such that it covers the pupil 102, the iris 104 and a portion of the sclera 106 and sits under both the upper and lower eyelids 108 and 110 respectively. The thicker stabilization zone 122 in this design is positioned over the cornea 112. Once stabilized, the stabilization zone 122 is maintained between the upper and lower eyelids 108 and 110.

Figure 2:
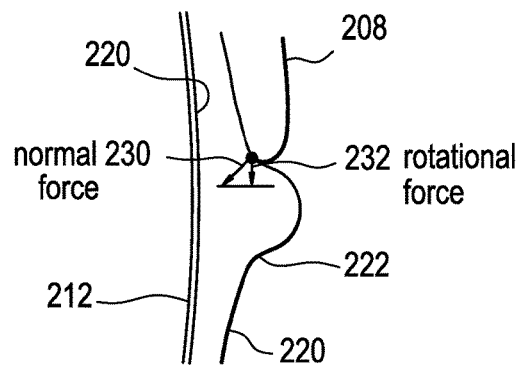
FIG. 2 is a detailed diagrammatic representation of the interaction zone between the upper eyelid and the contact lens of FIG. 1.

FIG. 2 illustrates in greater detail how the thicker stabilization zone 222 interacts with the upper eyelid 108 to induce a force that tends to rotate the contact lens 220. The critical parameter driving this rotational force is the angle of the contact area between the upper eyelid 208 and the stabilization zone 222 of the contact lens 220. As illustrated, the normal force, represented by vector 230, at a point of contact between the upper eyelid 208 and the periphery of the thicker stabilization zone 222 may be resolved into a rotational force, represented by vector 232. The steeper the angle of the stabilization zone 222, the greater the rotational force component of the normal force acting on the contact lens 220. Conversely, the lower or flatter the angle of the stabilization zone 222, the lower the rotational force component of the normal force acting on the contact lens 220.

In accordance with the present invention, the dynamic stabilization zone or zones may preferably be filled with a substance that may redistribute when pressure is applied.

Essentially, the present invention is directed to a contact lens incorporating one or more dynamic stabilization zones that comprise a material that create one or more dynamic stabilization zones having varying physical properties. In one exemplary embodiment, as is described in greater detail subsequently, the contact lens comprises one or more fluid or gel filled cavities forming dynamic stabilization zones. When the force or pressure from the eyelids compresses the edge of the one or more dynamic stabilization zones, the fluid or gel preferably redistributes with the cavity or cavities, thereby causing the one or more dynamic stabilization zones to change shape. More specifically, the increased pressure from the eyelids causes the local shape of the one or more stabilization zones at the eyelid contact point to increase thereby causing a larger rotational force than with a fixed shape stabilization zone or zones. As the eyelid movement continues, for example during a blink, this change in shape will result in a steepening of the angle of contact and thereby deliver more rotational force to the contact lens. In other words, as the eyelids continue to pass over the one or more dynamic stabilization zones, the fluid or gel continues to redistribute and the surface slopes continue to change. It may be possible with advanced modeling techniques to design dynamic stabilization zone(s) that provides both improved rotational speed upon insertion (auto-positioning) and increased stability of the contact lens when it is in position.

Figure 3A:
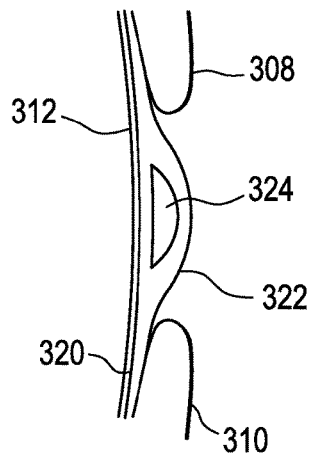
FIGS. 3A, 3B and 3C are diagrammatic representations of the progressive change in shape of a dynamic stabilization zone as a function of eyelid movement in accordance with the present invention.
Figure 3B:
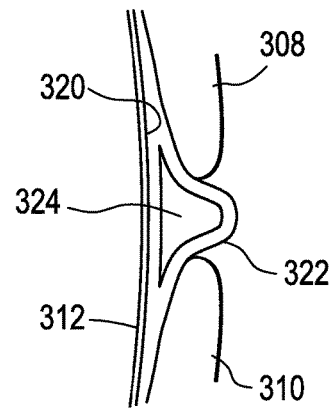
Figure 3C:
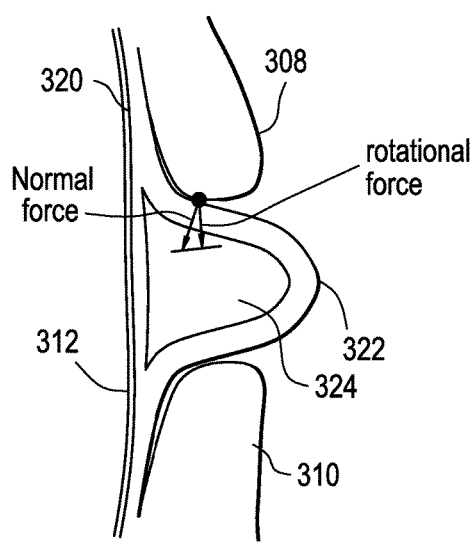

Referring to FIGS. 3A, 3B and 3C, there is illustrated the change in shape of a single dynamic stabilization zone as a function of eyelid movement over the contact lens. Although one or more dynamic stabilization zones may be utilized in a single contact lens, for ease of explanation only a single dynamic stabilization zone is described. FIG. 3A illustrates the position of the dynamic stabilization zone 322 of the contact lens 320 prior to blinking or eyelid movement. As illustrated, the eyelids 308 and 310 are positioned over the contact lens 320, but are not in contact with the dynamic stabilization zone 322 and thus have not caused any redistribution of the fluid or gel 324 within the cavity defining the dynamic stabilization zone 322. FIG. 3B illustrates the altered position (steeper angle) of the dynamic stabilization zone 322 during a blink. As the eyelids 308 and 310 converge, the pressure therefrom causes the fluid or gel 324 in the cavity defining the dynamic stabilization zone 322 to redistribute, thereby increasing the angle of the dynamic stabilization zone 322. FIG. 3C illustrates the further altered position of the dynamic stabilization zone 322 as the eyelids 308 and 310 continue to converge during blinking. As may be readily discerned from FIG. 3C, the steeper the angle of the dynamic stabilization zone 322, the closer the rotational force represented by vector 332 comes to the normal force represented by vector 330 which in turn indicates a greater proportion of the normal force is translated or resolved to rotational force acting on the contact lens 320.

Figure 4:
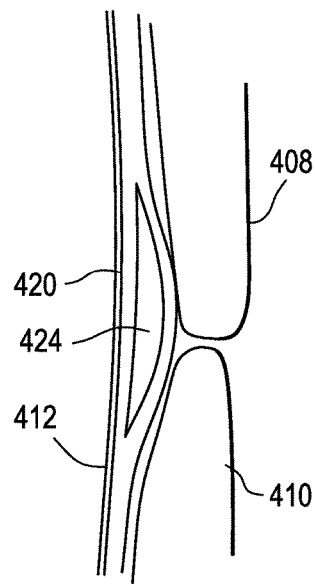
FIG. 4 is a diagrammatic representation of the dynamic stabilization zone with the upper and lower eyelids in full blink position in accordance with the present invention.

In addition to better rotational stability of the contact lens due to increased rotational force imparted by the eyelids, the dynamic stabilization zone design of the present invention preferably increases wearer comfort. Referring to FIG. 4, as full blink is achieved and the eyelids 408 and 410 pass over substantially the entire dynamic stabilization zone 422, the fluid or gel 424 within the cavity defining the dynamic stabilization zone 422 will once again redistribute due to the pressure exerted by the eyelids 408 and 410 into a flatter configuration. This flatter configuration allows the eyelids 408 and 410 to pass over the contact lens 420 with less downwardly directed force on the eye since the maximum thickness has been reduced due to the redistribution. Fixed stabilization zones do not thin out and thus may be less comfortable due to increased interaction with the eyelids passing over the contact lens.

As set forth herein, the contact lens of the present invention may comprise one or more dynamic stabilization zones. These one or more dynamic stabilization zones may comprise any suitable configuration and may be positioned at any suitable location on the contact lens to meet any number of design requirements. It is important to note, however, that in configuring any design that the upper and lower eyelids do not move strictly in a vertical direction, with an up down stroke during blinking. The upper eyelid moves substantially vertically, with a small nasal component during blinking, and the lower eyelid moves substantially horizontally, moving nasal ward during blinking with only a slight or small vertical movement. Additionally, the upper and lower eyelids are not symmetrical with respect to a plane cutting though the vertical meridian. In other words, individuals do not blink symmetrically relative to a horizontal axis drawn between the open upper and lower lid. Also, it is known that the eyes converge when the viewer gazes down. By taking both the upper and lower eyelid movements into account, one may optimize the configuration and location of the dynamic stabilization zone.

Figure 5:
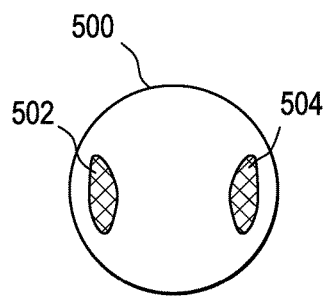
FIG. 5 is a diagrammatic representation of a first exemplary contact lens in accordance with the present invention.
Figure 6:
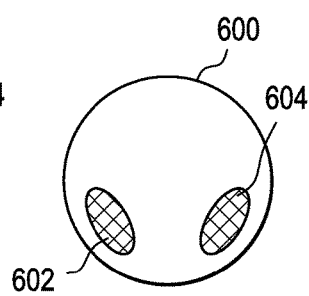
FIG. 6 is a diagrammatic representation of a second exemplary contact lens in accordance with the present invention.
Figure 7:
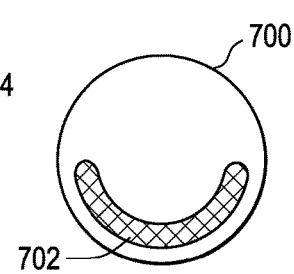
FIG. 7 is a diagrammatic representation of a third exemplary contact lens in accordance with the present invention.

FIG. 5 illustrates an exemplary embodiment of a contact lens 500 comprising two dynamic stabilization zones 502 and 504. In this exemplary embodiment, the fluid or gel filled cavities forming the dynamic stabilization zone 502 and 504 are positioned symmetrically about the horizontal axis of the contact lens 500 and about one hundred eighty degrees apart from one another. FIG. 6 illustrates another exemplary embodiment of a contact lens 600 also comprising two dynamic stabilization zones 602 and 604. In this exemplary embodiment, the fluid or gel filled cavities forming the dynamic stabilization zones 602 and 604 are shifted downwardly off the horizontal axis of the contact lens 600 and less than one hundred eighty degrees apart from one another as measured below the horizontal axis. This configuration utilizes gravity in combination with eyelid pressure to orient and maintain orientation of the contact lens 600 on the eye. FIG. 7 illustrates yet another exemplary embodiment of a contact lens 700 comprising a single dynamic stabilization zone 702. In this exemplary embodiment, the fluid or gel filled cavity forming the single dynamic stabilization zone 702 is formed in the lower peripheral region of the contact lens 700 such that gravity as well as eyelid pressure and/or eyelid movement operates on the contact lens 700 similarly to a prism ballast contact lens.

In accordance with yet another alternate exemplary embodiment, the present invention is directed to a contact lens having an optic region, a peripheral region surrounding the optic region, a front surface and a back surface, and at least one compliant dynamic translation zone incorporated into the contact lens between the front surface and the back surface in the peripheral region. The at least one compliant dynamic translation zone being formed from a deformable material and configured to interact with the eyelids such that the contact lens is prevented from moving with the eye, thus causing relative movement of the contact lens in a vertical direction with respect to the pupil of the eye upon down gaze. Translation is defined herein as the relative motion of the contact lens, and in particular the optic zone of the contact lens, against the and with respect to the natural pupil of the eye. As with the contact lens incorporating one or more dynamic stabilization zones, by taking both the upper and lower eyelid movements into account, one may optimize the configuration and location of the compliant dynamic translation zone.

U.S. Pat. No. 7,216,978 illustrates that the upper and lower eyelids do not move strictly in a vertical direction, with an up and down stroke during blinking. The upper lid moves substantially vertically, with a small nasal component during blinking, and the lower lid moves substantially horizontally, moving nasalward during blinking. Additionally, the upper and lower eyelids are not symmetrical with respect to a plane cutting though the vertical meridian. In other words, individuals do not blink symmetrically relative to a horizontal axis drawn between the open upper and lower lid. In addition, it is known that the eyes converge when the viewer gazes down to read. Accordingly, blinking in of itself may not result in the ideal translation of the contact lens. Therefore, by having a compliant dynamic translation zone that is properly positioned and configured, these movements may be accounted for in a manner providing improved or additional comfort with proper movement.

This exemplary embodiment of the invention utilizes dynamic fluid or gel translation zones positioned between the front and the back surfaces of a contact lens. Upon interacting with either the upper or lower eyelids, or in some cases both the upper and lower eyelids, those one or more fluid translational or translation zones of the contact lens may be deformed such that the resulting deformation results in a comfortable interaction of the contact lens with that of the eyelid while still providing adequate translation of the contact lens on the eye. In accordance with one aspect, as the wearer looks down to read, the first interaction of the lower eyelid with that of the dynamic translation zone of the contact lens results in a force on the contact lens causing it to shift upward, thus translating the contact lens upward relative to the pupil of the eye. Because this is a dynamic translation zone, comprising a fluid or gel that is readily compliant, the interaction with that of the eyelid to the dynamic translating zone is more comfortable as compared to a more rigid and less forgiving shape of the more conventional or prior art translation design. Through the balancing of the compliant nature of the dynamic translating zone with that of providing adequate but comfortable and dynamic resistance allows one to achieve the necessary translation of the contact lens in a comfortable fashion that would otherwise not be achievable with conventional designs.

Figure 8:
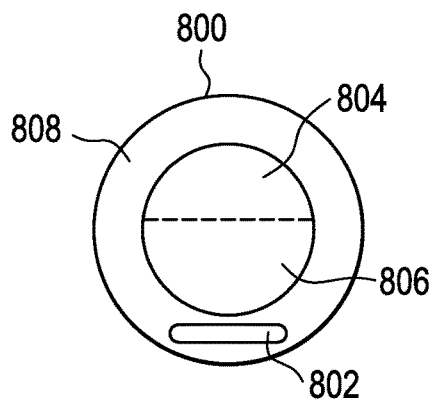
FIG. 8 is a diagrammatic representation of a contact lens comprising a single dynamic translating zone in accordance with the present invention.

Referring to FIG. 8, there is illustrated an ophthalmic device, for example, a contact lens 800 shaped and dimensioned to a user's eye and comprising at least one dynamic translating zone 802. The dynamic translating zone 802 comprises an elongated, linear configuration substantially similar to a truncation; however any suitable shape adapted for movement with the eyelids may be utilized. The contact lens 800 comprises a superior portion or region 804 including a distance vision correction zone, an inferior portion or region 806 including a near vision correction zone, a peripheral region 808 surrounding the distance vision and near vision correction zones, a front surface and a back surface. The dynamic translating zone 802 is incorporated into the contact lens 800 between the front surface and the back surface in the peripheral region 808. The at least one dynamic translating zone 802 being formed from a deformable material, as described herein, and being configured and positioned to interact with the eyelid of the user. More specifically, the dynamic translating zone 802 is configured and positioned such that when the wearer's eye looks down or in the inferior direction, the dynamic translating zone 802 interacts with the eyelid to ensure that the near vision correction zone in the inferior region 806 of the contact lens 800 is aligned with the pupil on the eye, and when the wearer's eye looks straight and/or up in the superior direction, the dynamic translating zone interacts with the eyelids to ensure that the distance correction zone of the superior portion 804 of the contact lens is aligned with the pupil of the eye. The contact lens 800 may comprise any suitable lens, including a multifocal contact lens or a toric multifocal soft contact lens.

Figure 11:
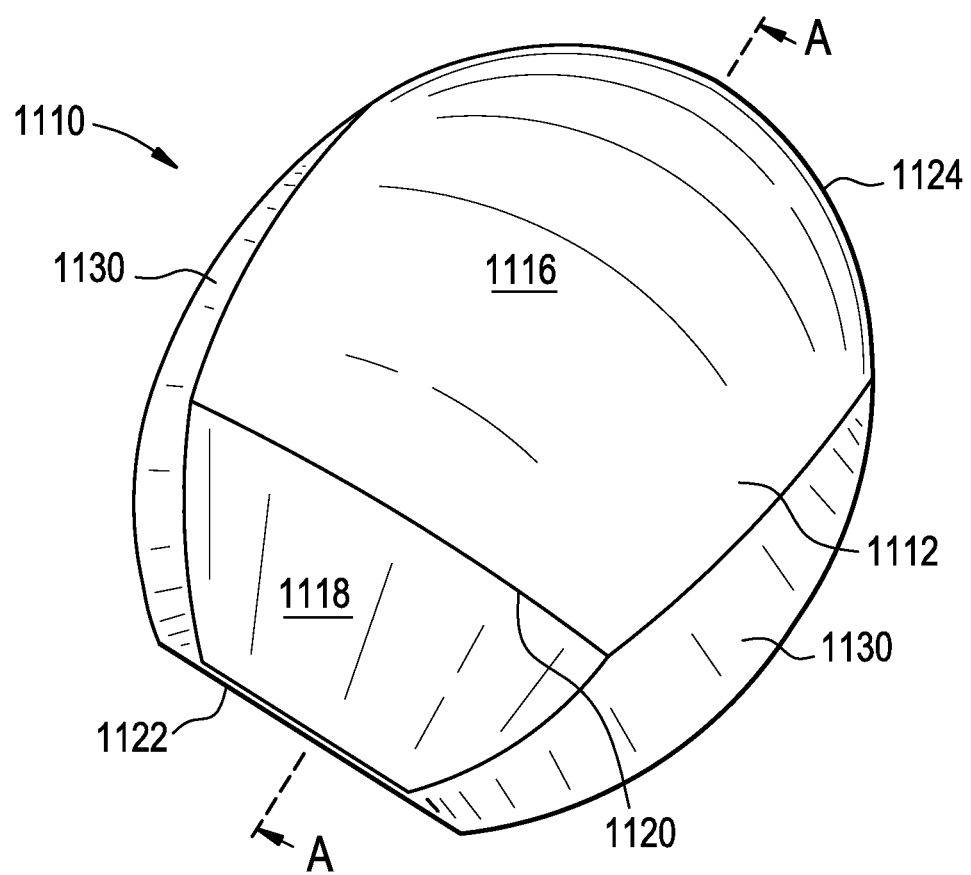
FIG. 11 is front perspective view of a prior art contact lens with a truncation.
Figure 12:
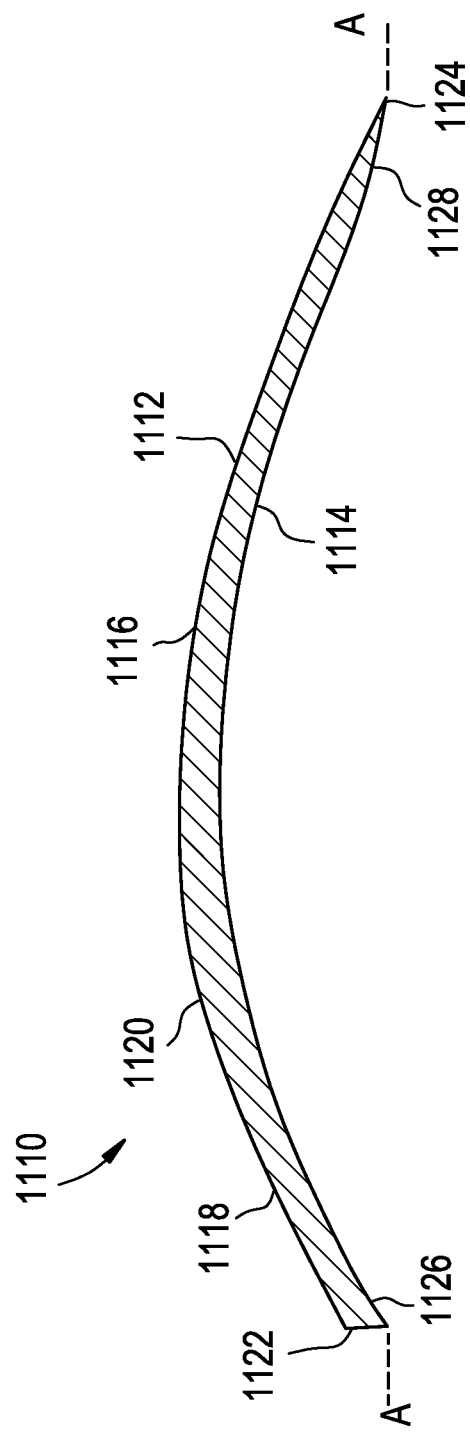
FIG. 12 is a cross-sectional view of the prior art contact lens of FIG. 11 along section line A-A.

In essence, the compliant dynamic translating or translation zone 802 functions as a truncation via a thicker region in a particular shape that may not only be tailored to eyelid geometry, but also conforms as do the dynamic stabilization zones described above. By conforming to the eye and lid shapes of an individual, the localized pressures are reduced, compared to a static translation zone, while maintaining the translational force exerted upon the lens. In other words, the compliant dynamic translation zone 802 is a truncation that gives upon a certain amount of pressure thereby providing balance between movement and comfort. It is important to note; however, that the complaint dynamic translation zone 802 may comprise any suitable shape and/or geometry and whose position may vary depending on the desired design. Preferably, the compliant dynamic translation zone 802 is positioned in the inferior portion of the peripheral region 808. FIGS. 11 and 12 illustrate a single prior art contact lens, in two views, with a thicker truncated edge. This prior art lens may be replaced with the compliant dynamic translation zone of the present invention.

Referring now to FIGS. 11 and 12, there is illustrated a contact lens 1110 having a front surface 1112 and a rear surface 1114. As illustrated in the drawings, the front surface 1112 is subdivided into a distant vision front segment 1116 and a close range vision front segment 1118. A distant vision front segment 1116 has a curvature which preferably conforms to a spherical, aspherical or toroidal shape. It has been found that use of an aspherical shape for the front segment 1116 enables the lens 1110 to be made relatively thin. Similarly, the close range vision front segment 1118 has a curvature which preferably conforms to a spherical, aspherical or toroidal shape. It has been found that the use of an aspherical shape allows for a progressively variable close range reading area. The segments 1116 and 1118 may meet along a laterally expanding line 1120 as shown in FIG. 11 depending on the respective curvatures of the segments 1116 and 1118. Alternately, the segments 1116 and 1118 may meet at a point. The segment 1118, as can be seen in FIG. 12, may be relatively thick compared to the segment 1116 and may be in the form of a prism. The prism stabilizes the contact lens 1110 on the eye and the amount of the prism depends on the lens power but it is preferably sufficient to hold the lens in position on the eye without rotation and without being uncomfortable for the patient.

The contact lens 1110 is formed of a flexible material which is also soft. For example, the contact lens 1110 may be formed of soft hydrogel, silicone or a hybrid material formed from soft hydrogel and silicone or other flexible, non-rigid material. Further, the lens 1110 is relatively large being, for example, larger than a corneal lens.

The contact lens 1110 has a lower end 1122 and an upper end 1124. The prism is located adjacent the lower end 1122. The presence of the prism adjacent the lower end 1122 results in the contact lens 1110 having a relatively bulky and heavy portion adjacent to the end 1122. The end 1122 is, as may best be seen in FIG. 12, truncated so as to leave an end surface which is relatively deep as shown in FIG. 12, compared to a nontruncated end. The truncation of the end 1122 allows the contact lens 1110 to rest on a lower eye lid of a patient so as to engage and hold the contact lens 1110 in position.

Further, the rear surface 1114 of the lens 1110 is formed in a curved shape which may be spherical or aspherical or may be toroidal to correct for a patient's astigmatism. Further, adjacent the end 1122 and the end 1124, the rear surface 1114 is preferably formed with secondary curve portions 1126 or 1128 respectively. The secondary curve portions 1126 and 1128 have a curvature which is less pronounced than that of the rear surface 1114 so as to modify the lens fitting on the eye so as to facilitate translocation. The secondary curves may each be a single curve, a series of curves, an aspherical curve, or a combination of these curves.

The secondary curve portions 1126 and 1128 are less pronounced (i.e., flatter) than the curvature of the main rear surface 1114 of lens 1110. In various examples, the secondary curve portions 1126 and 1128 may include one or more of flatter curves, varying widths, varying curves, a series of blended flatter curves, aspheric, or some other design that gradually makes the peripheral secondary curve portions 1126 and 1128 of lesser curvature (flatter) than the curvature of rear surface 1114. The flatter peripheral curve enables the lens 1110 to more readily move or translate over the flatter scleral portion of the eye when the eye looks down and the lens translates on the eye as described below.

What is important to note about the above described prior art contact lens 1110 is the thicker truncation 1122. This thicker truncation 1122 is no more flexible than the remainder of the contact lens and therefore is not compliant as is the translation zone of the present invention. In addition, this thicker region is at the edge of the contact lens 1110. Accordingly, this combination of factors makes the prior art lens 1110 less comfortable than the lens of the present invention.

Figure 13A:
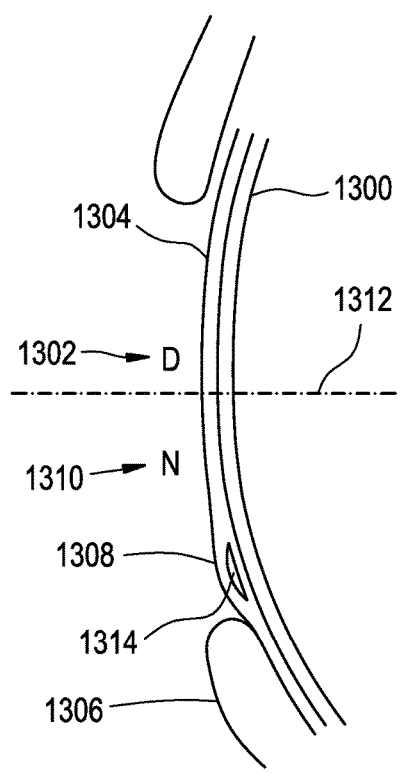
FIGS. 13A and 13B are diagrammatic representations of a contact lens with a single dynamic translating zone on eye in accordance with the present invention.
Figure 13B:
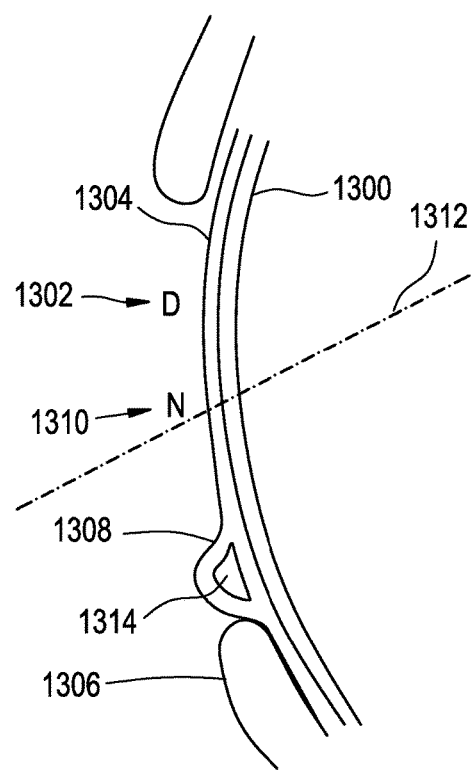

FIGS. 13A and 13B illustrate the concept behind the present invention. In FIG. 13A, the eye 1300 is gazing straight ahead and is focused on a distant object (not illustrated) and thus the distance vision correction zone 1302 represented by the letter "D" of the contact lens 1304 is aligned with the pupil of the eye 1300. In this position, the lower eyelid 1306 does not interact with the compliant dynamic translation zone 1308 but it may contact the compliant dynamic translation zone 1308. In FIG. 13B, the eye 1300 is gazing downwardly and is focused on a near object (not illustrated) and thus the near vision correction zone 1310 represented by the letter "N" is aligned with the pupil of the eye 1300. As the individual gazes downwardly, the compliant dynamic translation zone 1308 interacts with the eyelid 1306 in such a manner as to force the contact lens 1304 to move or shift upwards on the eye 1300 as illustrated by the positioning of the near vision correction zone 1310 and the letter "N" relative to the gaze direction axis 1312 of the eye 1300. It is important to note that this is relative movement and either or both the contact lens 1304 can move or the eye itself. Unlike the truncation 1122 of FIGS. 11 and 12, the translation zone 1308 is compliant and thus more comfortable. As with the above described dynamic stabilization zones, the translation zone 1308 may comprise any suitable material 1314 that balances the forces exerted by the eyelids and the other forces acting on the contact lens 1304.

While each of these exemplary embodiments may be utilized in accordance with the present invention, it is important to note that any number of dynamic stabilization/translation zone configurations may be utilized as long as the dynamic stabilization/translation zones contain or are fabricated from a moveable or flowable material that changes shape when the eyelid passes over the dynamic stabilization/translation zone, and their shape and placement are determined by taking into account eyelid movement as briefly described above. Non-symmetric designs, different designs for the left and right eyes, or custom stabilization/translation designs for a given eye are possible with the dynamic stabilization/translation zones of the present invention. In addition, custom contact lenses, for example, contact lenses fabricated directly from eye measurements, may incorporate dynamic stabilization/translation zones in accordance with the present invention. Independent of the configuration, shape and placement of the dynamic stabilization/translation zones on the contact lens is the ability of the material forming these or within these dynamic stabilization/translation zones to redistribute itself under the pressure of eyelid movement that makes the present invention work. Furthermore, the degree of or extent of deformation may be varied as well.

The material or materials utilized to form a dynamic stabilization/translation zone may comprise any suitable biocompatible material or materials that offer the desired mechanical properties. The material or materials should preferably be readily deformable under the pressure of eyelid movement as well as oxygen permeable or transmissive so that the one or more dynamic stabilization/translation zones on a contact lens do not interfere with the eye receiving needed oxygen. The one or more dynamic stabilization/translation zones in accordance with the present invention may be incorporated into any number of contact lenses, including those formed from silicone hydrogels, as long as the material or materials forming the one or more dynamic stabilization/translation zones is both chemically and physically compatible with the material or materials forming the contact lens. With respect to physical compatibility, the material or materials forming the contact lens preferably does not allow the material or materials forming a dynamic stabilization/translation zone, for example, a fluid or gel, to permeate and/or otherwise diffuse or leak from the cavity formed in the contact lens to secure the dynamic stabilization/translation zone. With respect to chemical compatibility, the material or materials forming a dynamic stabilization/translation zone preferably does not react in any manner with the material or materials forming the contact lens and/or the eye. The material or materials forming a dynamic stabilization/translation zone may be positioned or secured in a cavity and/or space formed in the correct region of the contact lens in any suitable manner as discussed in greater detail subsequently.

The material or materials forming a dynamic stabilization/translation zone may comprise any suitable biocompatible and deformable material having a glass transition temperature of less than about thirty-four degrees C.

Silicone based materials for forming the one or more dynamic stabilization/translation zones may be preferable in that silicone based materials, including silicone oils, have the desired mechanical properties or may be easily tailored to have the desired mechanical properties to enable the invention. Silicone based materials, including silicone oils, are also highly oxygen permeable. In addition, many soft contact lenses are formed from silicone based materials and as such would be compatible. Fluorosilicone based materials may also be utilized.

In alternate exemplary embodiments, the material or materials for forming the one or more dynamic stabilization/translation zones may comprise the same material or materials forming the contact lens. In another alternate exemplary embodiment, the material or materials for forming the one or more dynamic stabilization/translation zones may be in a solid, liquid or gas state. In yet another alternate exemplary embodiment, the material or materials for forming the one or more dynamic stabilization/translation zones may be in one form or state during the manufacturing process and in another form or state when place on the eye. For example, the material or materials for forming the one or more dynamic stabilization/translation zones may be solid or frozen during the manufacturing process and in liquid form thereafter. In still another alternate exemplary embodiment, the material or materials forming the one or more dynamic stabilization/translation zones may be a self contained material or combination of materials that may be incorporated directly into a cavity of the contact lens or it may be a material or combination of materials that preferably have to be encapsulated or otherwise protected prior to being incorporated into a cavity of the contact lens.

Figure 9:
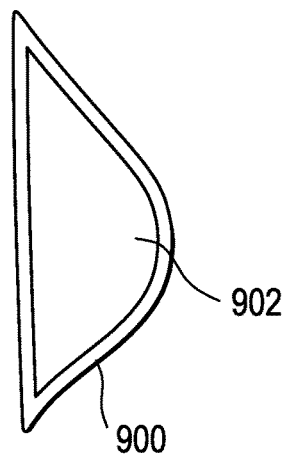
FIG. 9 is a diagrammatic representation of an exemplary dynamic zone capsule for a contact lens in accordance with the present invention.

As set forth above, the contact lens comprising one or more dynamic stabilization/translation zones of the present invention may be manufactured utilizing any number of processes. In one exemplary embodiment, the one or more dynamic stabilization/translation zones may be formed into capsules with a flexible outer material and pre-filled with the fluid or gel before being positioned in the contact lens. Some possible methods of manufacturing the capsules include welding, for example by heat or ultrasonically, two portions of film to form the top and bottom and injecting the fluid or gel before completing the seal around the edge. The film may comprise any suitable material, including those described above. FIG. 9 illustrates an exemplary embodiment of a capsule 900 with the fluid or gel 902 contained therein. The shape of the exemplary capsule 900 is arbitrary and only represents one possible design. A similar process, as set forth above, is to use a material for the one or more stabilization zones that may be positioned in the contact lens while frozen, but is liquid at eye temperatures. These premade fluid regions would preferably be placed into the contact lens molds with the contact lens raw material and bonded or encapsulated in the contact lens as the contact lens is cured.

In the exemplary embodiment wherein a space and/or cavity is created in the contact lens for the formation of a dynamic stabilization/translation zone, the space and/or cavity may be created in a manner similar to that of the manufacture of a hybrid contact lens. For example, in this exemplary process, a liquid monomer predose is applied to a front curve and then the deformable material in the desired form is applied thereto. Once the deformable material is accurately positioned in the desired location, the monomer is pre-cured to a specified amount to facilitate release of the mechanical fixturing device while maintaining positional accuracy. Finally, the remainder of the monomer is added, the back curve positioned and the entire assembly is cured.

Figure 10:
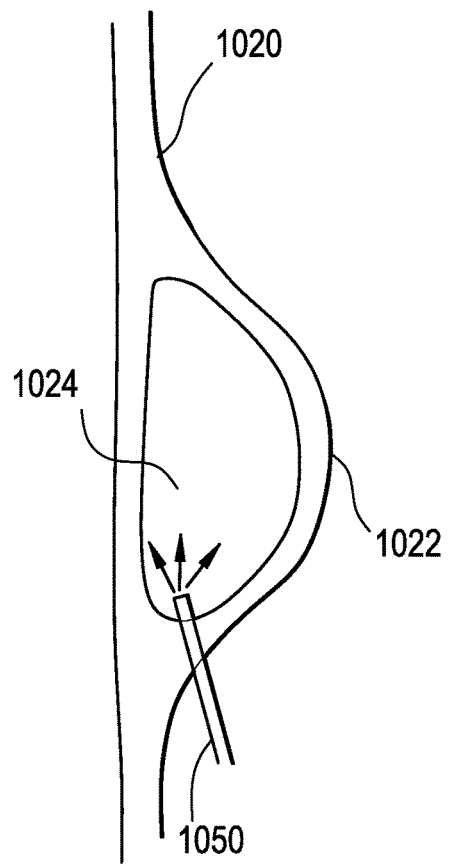
FIG. 10 is a diagrammatic representation of an exemplary process for fabricating a contact lens incorporating one or more dynamic stabilization zones in accordance with the present invention.

In accordance with another exemplary embodiment, the contact lens may be fabricated utilizing known processes then injected directly with the fluid or gel utilizing a needle or similar device. Essentially, the one or more dynamic stabilization/translation zone cavities would be formed by injecting the material directly into the contact lens at the desired location(s). FIG. 10 illustrates a needle 1050 inserted into the contact lens 1020 to create a dynamic stabilization/translation zone 1022 with a fluid or gel 1024 injected via the needle 1050. Once the material is injected and the needle removed, the hole at the insertion site may be sealed. In one exemplary embodiment, the injection hole may be sealed as part of the curing process. For example, the injection of the material may be done before the contact lens is fully cured and final cure would take place after removing the needle, allowing the uncured material to close the hole and then cure it closed.

In accordance with yet another exemplary embodiment, a process wherein contact lens material may be cured from the outside in, and by controlled curing on both sides may be utilized to create a thick region of uncured or under-cured material, i.e. different cross-link density, may thus be trapped, thereby forming the one or more dynamic stabilization/translation zones.

In accordance with yet another exemplary embodiment, a contact lens may be manufactured utilizing rotationally-symmetric contact lens molds, as if for a sphere product, while utilizing multiple curable formulations that, when cured, differ in their abilities to absorb water, in their elastic modulus, and in their monomer composition. For example, it is well-known to those of skill in the relevant art that curable contact lens formulations may be made more hydrophilic by way of incorporation of higher concentrations of monomers with greater affinity for water, for example, methacrylic acid. Furthermore, curable contact lens formulations may be adjusted to achieve a desired hydrated modulus by varying the amounts and/or types of crosslinking agents for example, ethylene glycol dimethacrylate.

In accordance with still another exemplary embodiment, one or more dynamic stabilization/translation zones may be realized by pad printing certain patterns onto a front curve during the contact lens fabrication process. In one exemplary embodiment, a printable dynamic stabilization/translation zone composition may be formulated to achieve relatively high equilibrium water content, for example, greater than sixty-five (65) percent and/or a relatively low modulus, for example, less than seventy (70) psi. It is also known to those of skill in the relevant art that the expansion factor (defined herein by as-processed lens volume divided by as-cured lens volume) of a liquid curable monomer mixture may be adjusted by adding or subtracting non-reactive diluents. Specifically, by reducing the diluent level, the expansion factor is increased. By increasing the diluent level, the expansion factor is reduced. Useful curable compositions for printing dynamic stabilization/translation zones could utilize curable monomer mixtures having a relatively low diluent level, thereby resulting in localized zones that will absorb more water and protrude from the front surface of the contact lens. With appropriate formulation of a low diluent content liquid curable monomer mixture to achieve relatively high equilibrium water content, a relatively low elastic modulus, and a suitable pad printing viscosity and volatility, a dynamic stabilization/translation zone pattern may be printed onto a front surface contact lens mold having utility according to the present invention. When fully processed, a contact lens having such a feature would be comprised of at least two distinct curable monomer formulations. Furthermore, the resulting contact lens would have proud dynamic stabilization/translation zones comprising hydrogel material that differs in composition, for example, water content, monomer content, and/or crosslink density, from the bulk of the contact lens. Accordingly, in such an exemplary embodiment, the one or more dynamic stabilization/translation zones are not fluid-filled sacs, rather, they are discrete viscoelastic zones having tailored chemical and physical properties.

In the case where stabilization/translation zones are pad printed onto a front curve with tailored curable liquid monomer mixtures, the composition of the mixture should be such that it will co-polymerize with the material that is used in the bulk of the contact lens. In this manner, the printed dynamic stabilization/translation zone is chemically bonded to the bulk of the contact lens, and such zones are processable in a similar manner to the bulk material of the contact lens.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device shaped and dimensioned to a user's eye, the ophthalmic device comprising:
    a corrective lens having an optic zone with a superior region including fixed far distance correction optics, an inferior region including fixed near correction optics, a peripheral zone surrounding the optic zone, a front surface and a back surface, the corrective lens being formed from a first material; and
    at least one compliant dynamic translation zone formed within a cavity in the corrective lens between the front and back surface in the peripheral zone configured to translate the lens on eye, the cavity being filled with a second material having a glass transition temperature of less than about thirty-four degrees C. that redistributes and changes shape within the cavity under eyelid pressure at eye temperature thereby allowing for the changing of the shape of the at least one compliant dynamic translation zone and wherein the second material is different from the first material, the at least one compliant dynamic translation zone forming an angle of contact with the eyelids wherein the angle of contact between the at least one compliant dynamic translation zone and the eyelids changes when the eyelids move across the at least one compliant dynamic translation zone by changing the shape of the second material such that the angle of contact between the eyelids and the at least one compliant dynamic translation zone increases or decreases depending on gaze direction thereby increasing or decreasing the translating force acting on the lens to ensure that the near correction optics in the optic zone align with the pupil of the eye by positioning of the corrective lens and when the user's eye gazes in at least one of a straight or superior direction, the far distance correction optics in the optic zone align with the pupil of the eye by positioning of the corrective lens, the second material flattens out under full blink conditions and does not impact the optic zone.

2. The ophthalmic device according to claim 1, wherein the corrective lens comprises a contact lens.

3. The ophthalmic device according to claim 2, wherein the contact lens comprises a soft contact lens.

4. The ophthalmic device according to claim 2, wherein the contact lens comprises a multifocal contact lens.

5. The ophthalmic device according to claim 2, wherein the contact lens comprises a toric contact lens.

6. The ophthalmic device according to claim 2, wherein the contact lenses comprise a toric multifocal soft contact lens.

7. The ophthalmic device according to claim 1, wherein the at least one compliant dynamic translation zone is configured as a protrusion arranged and positioned to interact with the eyelids.

8. The ophthalmic device according to claim 1, wherein the second material comprises a biocompatible liquid at eye temperature.

9. The ophthalmic device according to claim 1, wherein the second material comprises a biocompatible gel at eye temperature.

10. The ophthalmic device according to claim 1, wherein the second material comprises a biocompatible gas at eye temperature.

11. The ophthalmic device according to claim 1, wherein the second material comprises a crosslink density different from that of the material forming the corrective lens.

12. The ophthalmic device according to claim 1, wherein the second material comprises a silicone based material.

13. The ophthalmic device according to claim 1, wherein the second material comprises a fluorosilicone based material.

* * * * *